United States Patent
Miyazaki et al.

(10) Patent No.: US 6,762,576 B2
(45) Date of Patent: Jul. 13, 2004

(54) MOTOR DRIVING DEVICE FOR SUPPLYING DRIVING CURRENT TO A THREE-PHASE MOTOR THROUGH OUTPUT TRANSISTORS

(75) Inventors: Katsumi Miyazaki, Tokyo (JP); Daisuke Suetsugu, Tokyo (JP); Yuka Sugata, Tokyo (JP)

(73) Assignees: Renesas Technology Corp., Tokyo (JP); Mitsubishi Electric Engineering Company Limited, Tokyo (JP)

( * ) Notice: Subject to any disclaimer, the term of this patent is extended or adjusted under 35 U.S.C. 154(b) by 0 days.

(21) Appl. No.: 10/351,442

(22) Filed: Jan. 27, 2003

(65) Prior Publication Data

US 2004/0017168 A1 Jan. 29, 2004

(30) Foreign Application Priority Data

Jul. 26, 2002 (JP) ........................................ 2002-218532

(51) Int. Cl.[7] .............................................. H02P 7/06
(52) U.S. Cl. ...................... 318/254; 318/138; 318/439; 361/18; 327/561; 327/562
(58) Field of Search ................................ 318/254, 138, 318/439; 361/18; 327/561, 562

(56) References Cited

U.S. PATENT DOCUMENTS

| | | | |
|---|---|---|---|
| 1,656,777 A | | 1/1928 | Dennis |
| 3,604,913 A | * | 9/1971 | Crete ............................. 362/8 |
| 4,463,413 A | | 7/1984 | Shirley ........................ 362/401 |
| 4,803,606 A | | 2/1989 | Rotter ......................... 362/250 |
| 5,023,755 A | | 6/1991 | Rosenberg ................... 362/12 |
| 5,065,091 A | * | 11/1991 | Tobita ......................... 324/763 |
| 5,103,384 A | * | 4/1992 | Drohan ........................ 362/191 |
| 5,126,928 A | | 6/1992 | Hughes ....................... 362/287 |
| 5,424,931 A | * | 6/1995 | Wheeler ...................... 362/418 |
| 5,448,464 A | | 9/1995 | Moss .......................... 362/401 |
| 5,510,943 A | * | 4/1996 | Fukunaga ..................... 361/18 |
| 5,568,083 A | * | 10/1996 | Uchiyama et al. .......... 327/538 |
| 5,675,417 A | * | 10/1997 | Ventura et al. ............. 356/600 |
| 5,848,834 A | * | 12/1998 | Kerr ........................... 362/190 |
| 6,000,823 A | * | 12/1999 | Desmond et al. ........... 362/494 |
| 6,019,484 A | | 2/2000 | Seyler ......................... 362/287 |
| 6,205,079 B1 | * | 3/2001 | Namekawa ................. 365/226 |
| 6,294,941 B1 | * | 9/2001 | Yokosawa ................... 327/309 |

FOREIGN PATENT DOCUMENTS

JP          08-266085     10/1996

* cited by examiner

*Primary Examiner*—Rita Leykin
(74) *Attorney, Agent, or Firm*—Burns, Doane, Swecker & Mathis, L.L.P.

(57) ABSTRACT

A driving current flowing through a first output transistor is given to a stator coil of a three-phase motor (first operation), a driving current flowing through the stator coil is output to the ground through a second output transistor (second operation), and no current flows through the stator coil during the off-state of both the first and second output transistors (third operation). Charge remaining in a gate of the first output transistor is rapidly output to the ground through an n-channel transistor for a short time at both the end of the first operation and the start of the second operation. Charge of a high voltage remaining in the stator coil is output to the ground through a voltage clamp circuit as a clamp current during the first and second operations while controlling the clamp current to a low value in a constant current circuit.

5 Claims, 4 Drawing Sheets

MOTOR DRIVING DEVICE FOR SUPPLYING DRIVING CURRENT TO A THREE-PHASE MOTOR THROUGH OUTPUT TRANSISTORS

BACKGROUND OF THE INVENTION

1. Field of the Invention

The present invention relates to a motor driving device which is mainly formed of a semiconductor integrated circuit and supplies a driving current to drive a three-phase motor.

2. Description of Related Art

Output transistors supplying current to stator coils at high voltage and high electric power are placed at an output stage in a semiconductor integrated circuit so as to drive a three-phase motor. Each of these output transistors is frequently formed of an n-channel metal-oxide semiconductor field effect transistor (nMOSFET, hereinafter called n-channel transistor). The reason is that the on-state resistance per a unit area in a p-channel MOSFET (pMOSFET, hereinafter called p-channel transistor) is larger than that in the n-channel transistor. Therefore, when the output transistors are formed of p-channel transistors respectively, the manufacturing cost of a motor driving device having the output transistors is heightened.

FIG. 3 is a circuit view showing the configuration of a conventional motor driving device. In FIG. 3, 31$u$, 31$v$ and 31$w$ indicate three stator coils of a three-phase motor connected with each other in a Y shape. 1 indicates a direct voltage source. 2 indicates a high voltage source. 3 indicates the ground. 4 and 5 indicate a pair of n-channel output transistors. A driving current passes through the two stator coils and the n-channel output transistor 4 or 5 to drive the three-phase motor. 6 indicates a p-channel transistor used to drive the n-channel output transistor 4. 7 indicates an n-channel transistor used to drive the n-channel output transistor 4. 8 indicates an inverter for inverting a driving pulse A to input the inverted driving pulse A to gates of the transistors 6 and 7. 9 and 10 indicate two inverters serially connected with each other, and a driving pulse B is inverted twice in the inverters 9 and 10. 21 and 22 indicate two Zener diodes serially connected with each other in opposite directions. A voltage clamp circuit is formed of the Zener diodes 21 and 22.

A source of the p-channel transistor 6 is connected to the high voltage source 2, a drain of the p-channel transistor 6 is connected to a gate of the n-channel output transistor 4, and a gate of the p-channel transistor 6 is connected to an output terminal of the inverter 8. A drain of the n-channel transistor 7 is connected to the gate of the n-channel output transistor 4, a source of the n-channel transistor 7 is connected to the ground 3, and a gate of the n-channel transistor 7 is connected to the output terminal of the inverter 8.

A drain of the n-channel output transistor 4 is connected to the direct voltage source 1, and a source of the n-channel output transistor 4 is connected to a terminal W of the stator coil 31$w$. A drain of the n-channel output transistor 5 is connected to the terminal W of the stator coil 31$w$, a source of the n-channel output transistor 5 is connected to the ground 3, and a gate of the n-channel output transistor 5 is connected to an output terminal of the inverter 9. The driving pulse B is inverted in the inverter 10 and the inverter 9 in that order and is applied to the gate of the n-channel output transistor 5.

Also, the voltage clamp circuit composed of the Zener diodes 21 and 22 is placed to connect the gate and the source of the n-channel output transistor 4. The voltage clamp circuit is used to protect the n-channel output transistor 4 from an excess positive voltage and an excess negative voltage applied to the gate of the n-channel output transistor 4.

Also, a motor driving device having the same configuration as that of the motor driving device shown in FIG. 3 is connected to each of terminals U and V of the stator coils 31$u$ and 31$v$.

Next, an operation of the motor driving device connected to the terminal W of the stator coil 31$w$ will be described below.

FIG. 4 is a time chart of the driving pulses A and B input to the inverters 8 and 10 respectively, and each of FIG. 5A, FIG. 5B and FIG. 5C is an explanatory view showing an operation of the motor driving device.

As shown in FIG. 4, a timing of inputting the driving pulse A to the inverter 8 differs from a timing of inputting the driving pulse B to the inverter 10. As shown in FIG. 5A, when the driving pulse A is set to a high level, the driving pulse B is set to a low level. In this case, the gates of the transistors 6 and 7 are set to a low level due to the driving pulse A inverted in the inverter 8, the p-channel transistor 6 is turned on, and the n-channel transistor 7 is turned off. Thereafter, the gate of the n-channel output transistor 4 is set to a high level, and the n-channel output transistor 4 is turned on. Also, the gate of the n-channel output transistor 5 is set to a low level due to the driving pulse B inverted twice in the inverters 9 and 10, and the n-channel output transistor 5 is turned off. Therefore, in a first operation, a driving current is supplied from the direct voltage source 1 to the stator coils 31$w$ and 31$v$ through the n-channel output transistor 4 to drive the three-phase motor.

Also, as shown in FIG. 5B, when the driving pulse B is set to a high level, the driving pulse A is set to a low level. In this case, the gates of the transistors 6 and 7 are set to a high level due to the driving pulse A inverted in the inverter 8, the p-channel transistor 6 is turned off, the n-channel transistor 7 is turned on, the gate of the n-channel output transistor 4 is set to a low level, and the n-channel output transistor 4 is turned off. Also, the gate of the n-channel output transistor 5 is set to a high level due to the driving pulse B inverted twice in the inverters 9 and 10, and the n-channel output transistor 5 is turned on. Also, the direct voltage source 1 is connected to the terminal U of the stator coil 31$u$ due to the operation of the motor driving device connected to the terminal U. Therefore, in a second operation, a driving current supplied from the direct voltage source 1 flows through the stator coils 31$u$ and 31$w$ and goes to the ground 3 through the n-channel output transistor 5 to drive the three-phase motor.

In cases where the three-phase motor is driven, the driving pulses A and B are set to the low level together in a stop time period other than the active time period of the output transistor 4 or 5 shown in FIG. 5A or FIG. 5B. In this stop time period, as shown in FIG. 5C, both the n-channel output transistors 4 and 5 are set to the off-state together, no current passes through the stator coil 31$w$, and the motor driving device is set to a high impedance when the motor driving device placed at the output stage of the semiconductor integrated circuit is seen from the stator coil 31$w$. In this case, when the n-channel output transistor 4 or 5 is set to the off-state during the stop time period after the first or second operation shown in FIG. 5A or FIG. 5B, charge supplied from the direct voltage source 1 remains in the stator coil 31$w$, and the terminal W is set to a high voltage due to the remaining charge. Therefore, in cases where a voltage higher than a withstand voltage between the gate and the source of the n-channel output transistor 4 is supplied from the direct voltage source 1 to the stator coil 31w, it is required to protect the n-channel output transistor 4 from the excess voltage applied between the gate and the source of the n-channel output transistor 4 and to prevent the gate of the n-channel output transistor 4 from being damaged.

To protect the n-channel output transistor 4, the voltage clamp circuit composed of the Zener diodes 21 and 22 is placed to connect the gate and the source of the n-channel output transistor 4. In a third operation, as shown in FIG. 5C, the voltage clamp circuit composed of the Zener diodes 21 and 22 is operated in the stop time period, and a clamp current flows from the terminal W to the ground 3 through the n-channel transistor 7 to remove the remaining charge.

However, because the conventional motor driving device has the above-described configuration, following problems occur.

When the motor driving device is set to the high impedance in the stop time period, a voltage of the terminal W is generally equal to half of the voltage of the direct voltage source 1. Therefore, the higher the voltage of the direct voltage source 1, the larger the clamp current. In this case, because the remaining charge is discharged to the ground 3 as the clamp current, loss of an electric power is large. Recently, it has been desired to operate a semiconductor integrated circuit at a low consumed electric power. However, the clamp current inevitably occurs in the motor driving device, it is difficult to drive the three-phase motor at a low consumed electric power by supplying a driving current to the three-phase motor from the motor driving device. In particular, when the motor driving device placed at the output stage of the semiconductor integrated circuit is operated at high voltage and high electric power, the influence of the electric power loss due to the clamp current on the consumed electric power of the three-phase motor is very high.

SUMMARY OF THE INVENTION

An object of the present invention is to provide, with due consideration to the drawbacks of the conventional motor driving device, a motor driving device formed of a semiconductor integrated circuit in which an electric power consumed to operate a motor is lowered while lowering a clamp current to a low value.

The object is achieved by the provision of a motor driving device including a first output transistor, a first transistor switch, a second output transistor, a voltage clamp circuit and a constant current circuit. In the voltage clamp circuit, charge of a high voltage, which is generated in a line between the first output transistor and the second output transistor when both the first output transistor and the second output transistor are set to the off-state together, is released from the line as a clamp current. In the constant current circuit, the clamp current of the voltage clamp circuit is controlled to a low value.

Therefore, when the clamp current is generated, the clamp current is controlled to a low value so as to lower an electric power consumed for the driving of the motor. Accordingly, the motor driving device appropriate to the semiconductor integrated circuit can be obtained.

DETAILED DESCRIPTION OF THE PREFERRED EMBODIMENTS

An embodiment of the present invention will now be described with reference to the accompanying drawings.
EMBODIMENT 1

Figure 1:
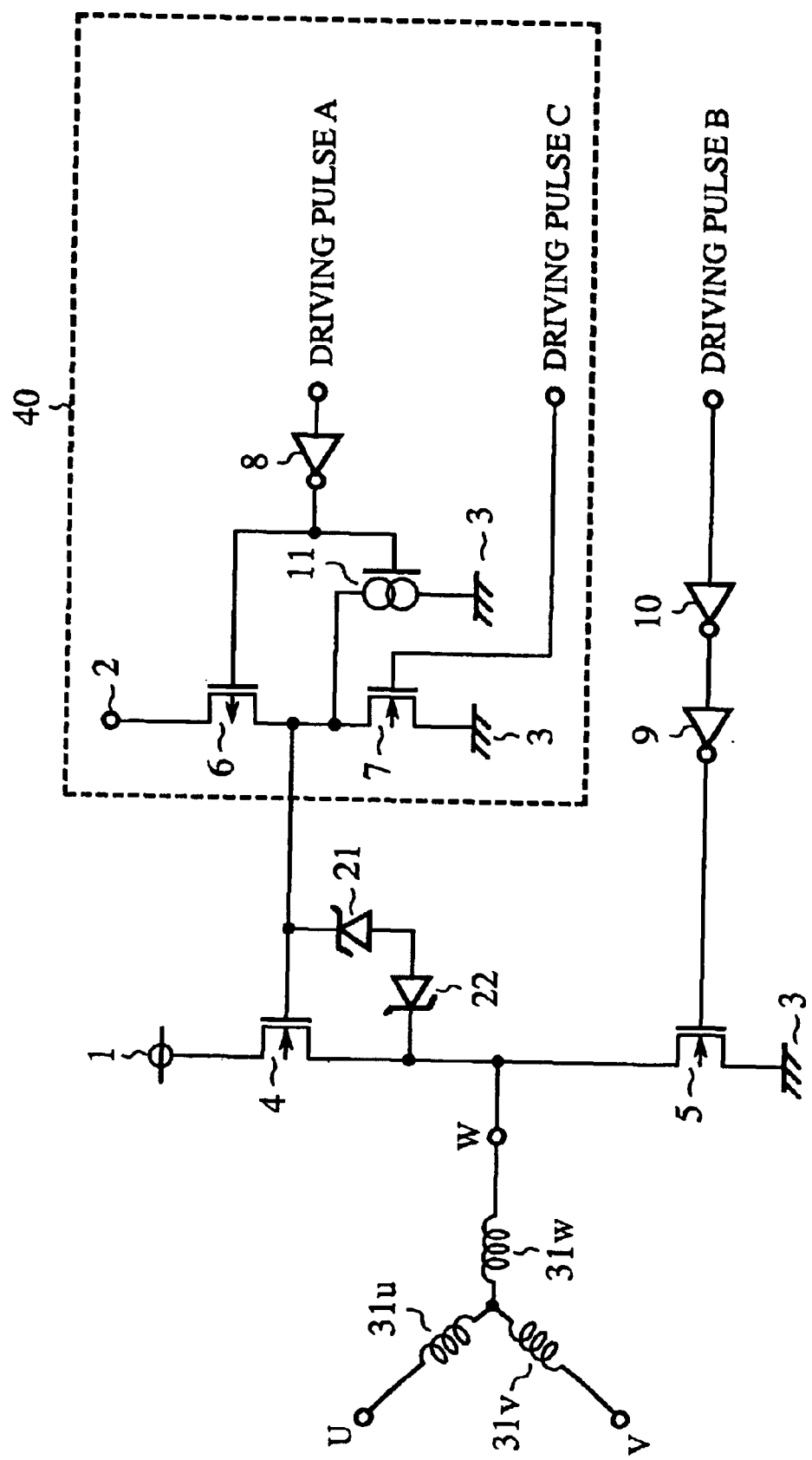
FIG. 1 is a circuit view showing the configuration of a motor driving device according to a first embodiment of the present invention.
Figure 3:
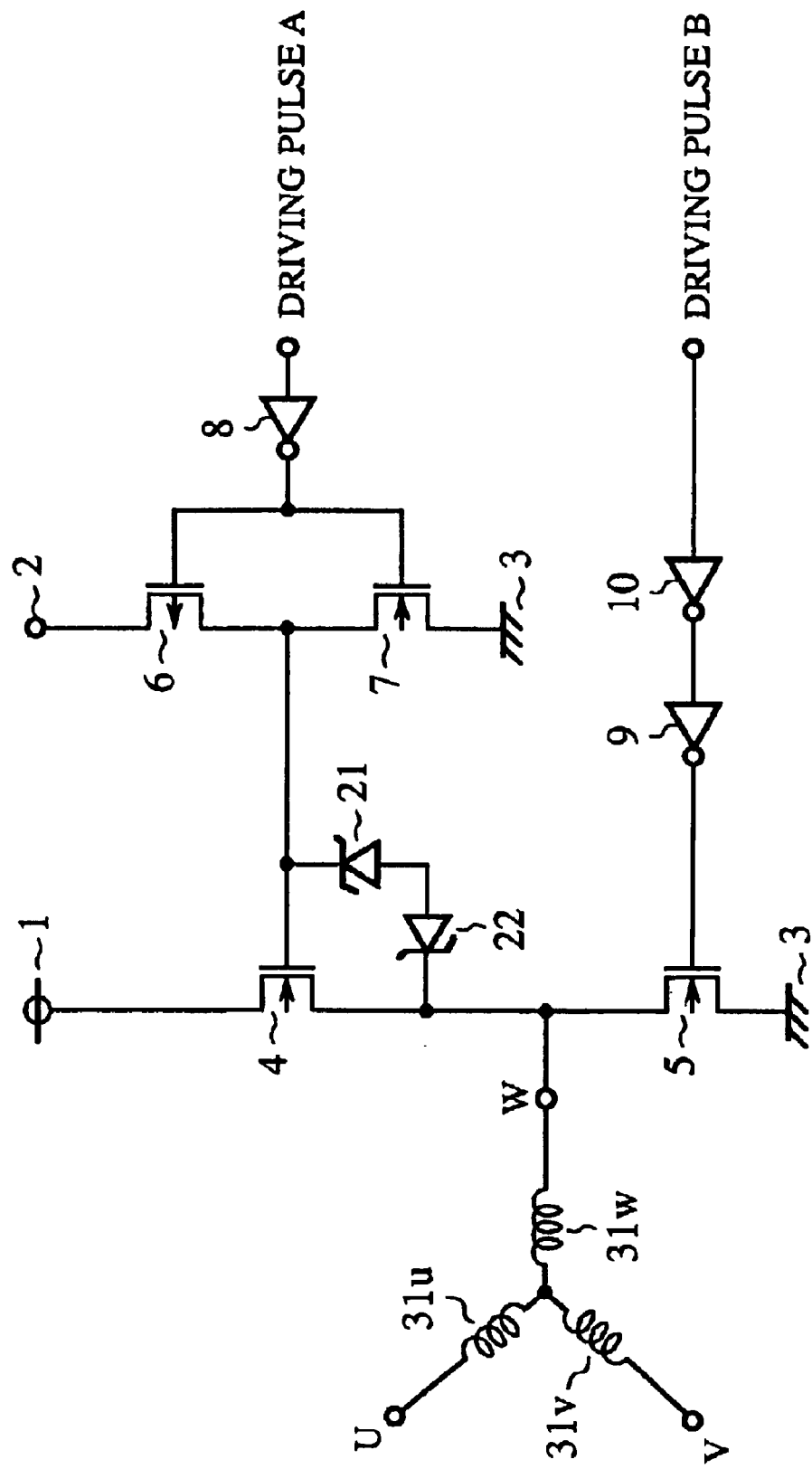
FIG. 3 is a circuit view showing the configuration of a conventional motor driving device.
Figure 5A:
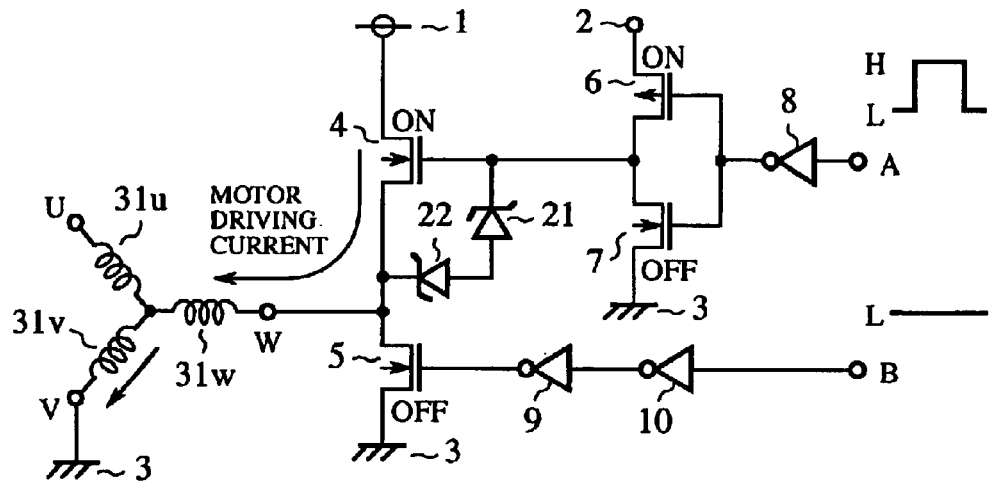
FIG. 5A is an explanatory view showing a first operation of the motor driving device.
Figure 5B:
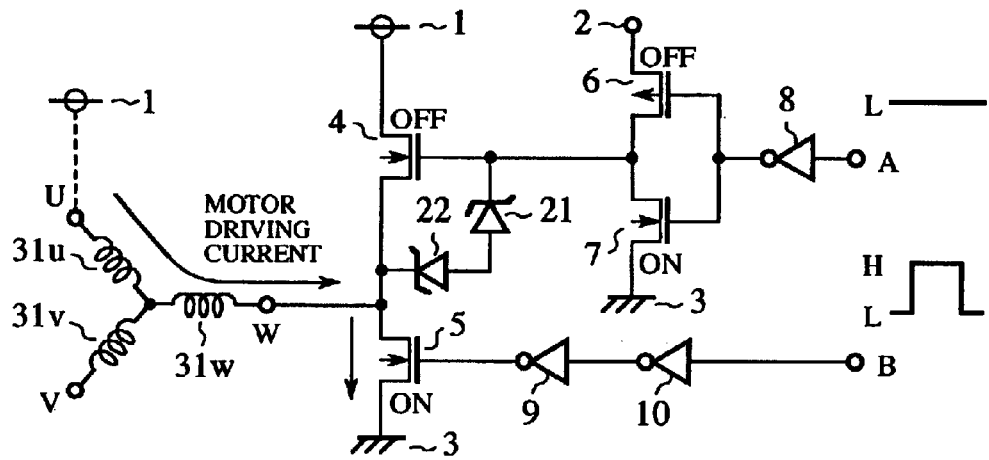
FIG. 5B is an explanatory view showing a second operation of the motor driving device.
Figure 5C:
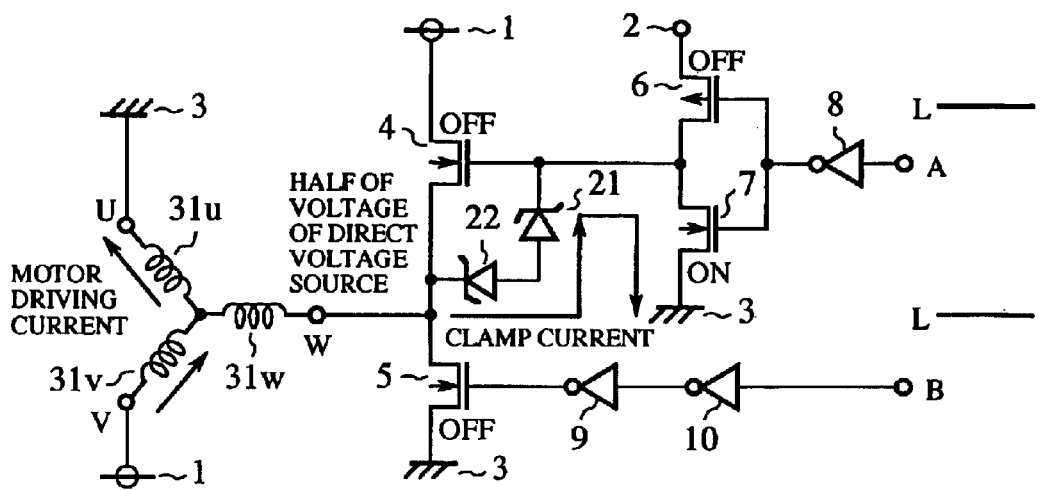
FIG. 5C is an explanatory view showing a third operation of the motor driving device.

FIG. 1 is a circuit view showing the configuration of a motor driving device according to a first embodiment of the present invention. The constituent elements, which are the same as those shown in FIG. 3, are indicated by the same reference numerals as those of the constituent elements shown in FIG. 3, and additional description of those constituent elements is omitted.

In FIG. 1, 40 indicates a transistor circuit of which an output voltage is applied to the gate of the first output transistor 4. 11 indicates a constant current circuit placed to connect the voltage clamp circuit composed of the Zener diodes 21 and 22 and the ground 3. In this embodiment, one end of the voltage clamp circuit is connected to the gate of the first output transistor 4. However, it is applicable that the end of the voltage clamp circuit is not connected to the gate of the first output transistor 4 on condition that the end of the voltage clamp circuit is connected to the constant current circuit 11.

The inverter 8 outputs an output signal in response to the driving pulse (or first driving pulse) A of a high level, and the constant current circuit 11 is controlled by the inverted driving pulse A output from the inverter 8 so as to be set to the on-state or the off-state which is different from the off-state or the on-state of the p-channel transistor (or first transistor switch) 6 set by the output signal of the inverter 8. The constant current circuit 11 is adjusted to pass current of a low value when the constant current circuit 11 is set to the on-state.

Also, a driving pulse (or third driving pulse) C of a high level is input to the gate of the n-channel transistor (or second transistor switch) 7 to turn on the n-channel transistor 7.

The driving pulse (or second driving pulse) B of a high level is inverted twice in the inverters 10 and 9 and is input to the gate of the second output transistor 5 to turn on the second output transistor 5.

Next, an operation of the motor driving device different from that of the conventional motor driving device of FIG. 3 will be described below.

Figures 2, 4:
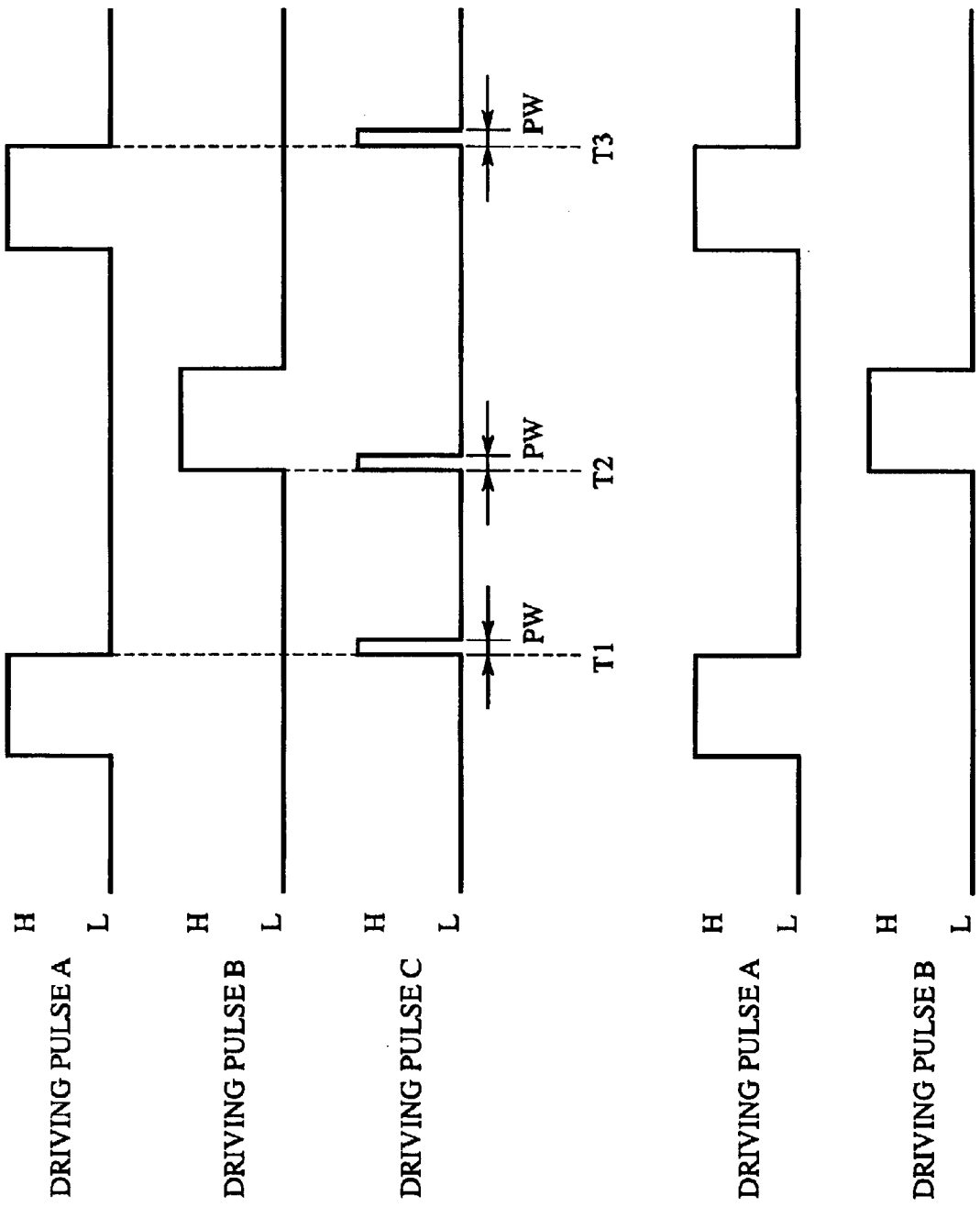
FIG. 2 is a time chart of driving pulses A, B and C used for the motor driving device shown in FIG. 1.
FIG. 4 is a time chart of driving pulses A and B used for the conventional motor driving device shown in FIG. 3.

FIG. 2 is a time chart of the driving pulses A, B and C. As shown in FIG. 2, the driving pulse C is generated at a pulse fall time T1 or T3 of each driving pulse A and a pulse rise time T2 of each driving pulse B. A pulse width PW of the driving pulse C is sufficiently short as compared with those of the driving pulses A and B.

When the driving pulse A is set to a high level, the p-channel transistor 6 is turned on, the n-channel transistor 7 is set in the off-state due to the driving pulse C set in a low level, and the first output transistor 4 is turned on. Also, the constant current circuit 11 is set in the off-state during the high level of the driving pulse A, and no current flows through the constant current circuit 11. Therefore, in the first operation, a driving current is supplied from the direct voltage source 1 to the stator coils 31$w$ and 31$v$ through the first output transistor 4 to drive the three-phase motor.

Thereafter, when the driving pulse A is set to a low level, the p-channel transistor 6 is turned off, and the n-channel transistor 7 is set in the on-state for a short time due to the driving pulse C set in a high level. Therefore, at the end of the first operation, charge remaining in the gate of the first output transistor 4 is discharged to the ground 3 through the n-channel transistor 7 in a short time, and the first output transistor 4 is turned off. In this case, it is preferred that an impedance of the n-channel transistor 7 at the on-state is set to a very low value. Therefore, the first output transistor 4 is rapidly turned off. Also, the constant current circuit 11 is set in the on-state during the low level of the driving pulse A. Also, the second output transistor 5 is set in the off-state until the driving pulse B inverted twice in the inverters 10 and 9 is input to the gate of the second output transistor 5. Therefore, no current passes through the stator coil 31$w$. When the motor driving device placed at the output stage of a semiconductor integrated circuit is seen from the stator coil 31$w$, the impedance of the motor driving device is heightened. In this case, when a source voltage of the first output transistor 4 is high, the voltage clamp circuit composed of the Zener diodes 21 and 22 is operated, and a clamp current flows from the source of the first output transistor 4 to the ground 3 through the voltage clamp circuit and the constant current circuit 11 while lowering the clamp current to a low value in the constant current circuit 11. Therefore, the constant current circuit 11 functions so as to set the clamp current to a low value.

Next, the influence of a gate charge capacity and a mirror effect of the first output transistor 4 on the motor driving device will be described below.

Assuming that the n-channel transistor 7 is not arranged in the motor driving device, the charge of the gate of the first output transistor 4 is gradually discharged to the ground 3 through only the constant current circuit 11. In this case, the first output transistor 4 cannot be rapidly turned off. Also, when an output voltage at the source of the first output transistor 4 is rapidly lowered, it is sometimes impossible to maintain the off-state of the first output transistor 4. To prevent these problems, the n-channel transistor 7 is operated in response to the driving pulse C input at a prescribed timing, and the gate of the n-channel transistor 7 is rapidly set to the ground level.

In detail, when the p-channel transistor 6 is turned off at the time T1 or T3 to set the first output transistor 4 to the off-state, the n-channel transistor 7 is set to the on-state in response to the driving pulse C for a short time. Therefore, charge remaining in the gate of the first output transistor 4 is rapidly discharged to the ground 3 through the n-channel transistor 7, and the first output transistor 4 can be rapidly turned off.

Also, when the driving pulse B is risen up at the time T2, the second output transistor 5 is turned on, and the output voltage at the terminal W of the stator coil 31$w$ is rapidly lowered. In this case, assuming that the gate voltage of the first output transistor 4 is not changed, an electric potential difference Vgs between the source and the gate of the first output transistor 4 is enlarged, and the first output transistor 4 is undesirably turned on. To prevent the undesirable turning-on of the first output transistor 4, when the driving pulse B is risen up at the time T2, the n-channel transistor 7 is set to the on-state in response to the driving pulse C for a short time, the gate voltage of the first output transistor 4 is rapidly lowered to prevent the first output transistor 4 from turning on. Therefore, the three-phase motor can be stably operated at the start of the second operation.

As is described above, in the first embodiment, the constant current circuit 11 is placed between the voltage clamp circuit composed of the Zener diodes 21 and 22 and the ground 3. Therefore, in the third operation, even though a clamp current flows from the source of the first output transistor 4 to the ground 3 through the voltage clamp circuit during the stop time period in which the output transistors 4 and 5 are set to the off-state together, the clamp current is controlled to a low value by the constant current circuit 11. Accordingly, because the clamp current of a low value flows to the ground 3 through the constant current circuit 11, an electric power consumed to operate the three-phase motor can be lowered.

Also, when the p-channel transistor 6 is turned off to set the first output transistor 4 to the off-state, the n-channel transistor 7 is set to the on-state for a short time to rapidly lower the gate voltage of the first output transistor 4 to the ground level. Therefore, the first output transistor 4 can be rapidly turned off at the end of the first operation, and the three-phase motor can be operated at high performance.

Also, when the second output transistor 5 is turned on during the off-state of the first output transistor 4, the n-channel transistor 7 is set to the on-state for a short time to rapidly lower the gate voltage of the first output transistor 4. Accordingly, even though the source voltage of the first output transistor 4 is rapidly changed at the start of the second operation, the off-state of the first output transistor 4 can be reliably maintained.

In the first embodiment, each of the output transistors 4 and 5 is formed of an n-channel transistor to obtain a small-sized motor driving device. However, it is applicable that each of the output transistors 4 and 5 or one of the output transistors 4 and 5 be formed of a p-channel transistor.

Also, in the first embodiment, it is applicable that an n-channel transistor be used in place of the p-channel transistor 6, and it is applicable that a p-channel transistor be used in place of the n-channel transistor 7.

Also, in the first embodiment, MOSFET is used for the motor driving device. However, it is applicable that bipolar transistors (PNP transistor and NPN transistor) be used in place of MOSFET.

What is claimed is:

1. A motor driving device comprising:

a first output transistor through which a driving current flows to a stator coil of a motor in a case where the first output transistor is set to an on-state;

a first transistor switch for setting the first output transistor to the on-state in response to a first driving pulse and setting the first output transistor to an off-state in response to no reception of the first driving pulse;

a second output transistor which is set to an on-state in response to a second driving pulse, of which a timing differs from that of the first driving pulse, and is set to an off-state in response to no reception of the second driving pulse and through which another driving current flowing from the stator coil of the motor is output to a ground during the on-state of the second output transistor;

a voltage clamp circuit for releasing charge of a high voltage, which is generated in a line between the first output transistor and the second output transistor when both the first output transistor and the second output transistor are set to the off-state together, from the line as a clamp current; and a constant current circuit for controlling the clamp current of the voltage clamp circuit to a low value.

2. The motor driving device according to claim 1, further comprising:

a second transistor switch for releasing charge from a gate of the first output transistor to the ground in response to a third driving pulse which is generated at both a pulse fall time of the first driving pulse and a pulse rise up time of the second driving pulse.

3. The motor driving device according to claim 2, wherein the third driving pulse has a short pulse width as compared with those of the first and second driving pulses.

4. The motor driving device according to claim 2, wherein the second transistor switch is formed of a transistor which is set to an on-state in response to the third driving pulse and has a low impedance in a condition of the on-state.

5. The motor driving device according to claim 1, wherein the clamp current of the low value flows from the voltage clamp circuit to the ground through the constant current circuit during no reception of the first driving pulse in the constant current circuit.

* * * * *